US009233730B2

(12) United States Patent
Kariyama et al.

(10) Patent No.: US 9,233,730 B2
(45) Date of Patent: Jan. 12, 2016

(54) BICYCLE CONTROL DEVICE

(71) Applicant: Shimano Inc., Sakai, Osaka (JP)

(72) Inventors: Osamu Kariyama, Osaka (JP); Tatsuya Kawakami, Osaka (JP); Daisuke Nago, Osaka (JP); Tatsuya Matsushita, Osaka (JP); Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/089,686

(22) Filed: Nov. 25, 2013

(65) Prior Publication Data

US 2014/0144275 A1    May 29, 2014

(30) Foreign Application Priority Data

Nov. 29, 2012 (JP) .............................. 2012-007230 U

(51) Int. Cl.
   *F16C 1/10*    (2006.01)
   *B60T 11/00*   (2006.01)
   *B62K 23/06*   (2006.01)
   *B62L 3/02*    (2006.01)
   *B62M 25/04*   (2006.01)
(52) U.S. Cl.
   CPC ................. *B62K 23/06* (2013.01); *B62L 3/023* (2013.01); *B62M 25/04* (2013.01); *Y10T 74/2028* (2015.01)
(58) Field of Classification Search
   CPC ........ B62L 3/023; B62K 23/06; B62M 25/04; Y10T 74/2028
   USPC .......... 74/473.14, 473.15, 488, 489, 501.5 H, 74/502.2; 60/584, 594; 188/24.11, 344
   See application file for complete search history.

(56) References Cited

U.S. PATENT DOCUMENTS

| 4,175,648 A | 11/1979 | Sule |
| 4,391,353 A | 7/1983 | Mathauser |
| 4,665,803 A | 5/1987 | Mathauser |
| 4,921,081 A | 5/1990 | Chilcote |
| 5,241,878 A | 9/1993 | Nagano |
| 6,216,078 B1 | 4/2001 | Jinbo et al. |

(Continued)

FOREIGN PATENT DOCUMENTS

| CN | 1550405 A | 12/2004 |
| EP | 1 650 121 A2 | 4/2006 |

(Continued)

OTHER PUBLICATIONS

European Search Report of corresponding EP Application No. 13 193680.9 dated Jun. 26, 2014.

*Primary Examiner* — Adam D Rogers
(74) *Attorney, Agent, or Firm* — Global IP Counselors

(57) ABSTRACT

A bicycle control device basically includes a housing member, a hydraulic fluid pressure generator, a control lever member and a shift-operating mechanism. The housing member has an attachment part for attachment to a handlebar, and a grip part configured to be gripped by a rider in a riding position. The hydraulic fluid pressure generator has a cylinder provided inside the grip part of the housing member, and a piston movably disposed within the cylinder to generate fluid pressure for controlling a braking device. The control lever member has a first operation lever pivotably coupled relative to the housing member for pivoting about a first axis to operate the piston. The shift-operating mechanism is configured to be coupled to a shifting device by a control cable control. The shift-operating mechanism is mounted on the control lever member.

19 Claims, 12 Drawing Sheets

(56) References Cited

U.S. PATENT DOCUMENTS

| | | | |
|---|---|---|---|
| 6,647,823 B2 * | 11/2003 | Tsumiyama et al. | 74/501.6 |
| 6,691,591 B2 | 2/2004 | Tsumiyama et al. | |
| 6,804,961 B2 * | 10/2004 | Lumpkin | 60/588 |
| 7,650,813 B2 | 1/2010 | Tsumiyama | |
| 8,201,670 B2 | 6/2012 | Tetsuka et al. | |
| 8,281,910 B2 * | 10/2012 | Tsai | 188/344 |
| 8,464,844 B2 | 6/2013 | Jordan | |
| 8,549,955 B2 * | 10/2013 | Sato et al. | 74/502.2 |
| 2002/0139637 A1 | 10/2002 | Tsumiyama et al. | |
| 2012/0240715 A1 | 9/2012 | Tsai | |
| 2013/0255239 A1 | 10/2013 | Miki | |
| 2014/0174236 A1 * | 6/2014 | Nakakura et al. | 74/473.14 |
| 2015/0001018 A1 * | 1/2015 | Kariyama et al. | 188/344 |
| 2015/0090550 A1 * | 4/2015 | Matsueda et al. | 188/344 |

FOREIGN PATENT DOCUMENTS

| | | |
|---|---|---|
| EP | 1 854 713 A2 | 1/2007 |
| GB | 2 154 292 A | 9/1985 |

\* cited by examiner

BICYCLE CONTROL DEVICE

CROSS-REFERENCE TO RELATED APPLICATIONS

This application claims priority under 35 U.S.C. §119 to Japanese Patent Application No. 2012-007230, filed Nov. 29, 2012. The entire disclosure of Japanese Patent Application No. 2012-007230 is hereby incorporated herein by reference.

BACKGROUND

1. Field of the Invention

This invention generally relates to a bicycle control device. More specifically, the present invention relates to a bicycle control device which can be mounted on the handlebar of a bicycle and which can control a braking device and a shifting device.

2. Background Information

Bicycle control devices are conventionally known, which can be mounted on a handlebar of a bicycle for controlling both a braking device and a shifting device (for example, see FIG. 10 of Japanese Patent Publication No. 3769237). A conventional bicycle control device comprises a support member capable of being attached to a handlebar in the form of a bar handle, a shift-operating mechanism coupled to the support member, and a control lever for operating braking and shifting, the control lever being pivotally attached to the support member. In a conventional bicycle control device, the shifting device is coupled by a shift control cable, and the control device is coupled by a hydraulic fluid pressure tube. In a bicycle control device having such a configuration, the braking operation of the braking device and the winding and winding release operations of the shifting device can be performed by the control lever. The braking operation and shifting operation can thereby be performed by one control lever.

SUMMARY

Generally, in a conventional bicycle control device, because the support member is configured so as to be mounted on a handlebar, it is not possible to configure a bicycle control device that can be mounted on a drop handlebar used in road races and the like, and that has a grip part that can be gripped by a rider.

One object presented in this disclosure is to provide a bicycle control device that can be mounted on a drop handlebar that is used in road races and the like, that has a grip part that can be gripped by a rider, and that can perform a braking operation by hydraulic fluid pressure and a shifting operation by cables.

In view of the state of the known technology and in accordance with a first aspect of the present disclosure, a bicycle control device is provided that is capable of being mounted on the handlebar of a bicycle and capable of controlling a braking device and a shifting device. The bicycle control device basically comprises A bicycle control device basically includes a housing member, a hydraulic fluid pressure generator, a control lever member and a shift-operating mechanism. The housing member has an attachment part for attachment to a handlebar, and a grip part configured to be gripped by a rider in a riding position. The hydraulic fluid pressure generator has a cylinder provided inside the grip part of the housing member, and a piston movably disposed within the cylinder to generate fluid pressure for controlling a braking device. The control lever member has a first operation lever pivotally coupled relative to the housing member for pivoting about a first axis to operate the piston. The shift-operating mechanism is configured to be coupled to a shifting device by a control cable control. The shift-operating mechanism is mounted on the control lever member.

In this bicycle control device, the shifting device is operated via the control cable by grip part of the housing member and operating the control lever member to activate the shift-operating mechanism. The braking device is also controlled by the hydraulic fluid pressure generated from the piston of the hydraulic fluid pressure generator being moved by the operation of the first operation lever of the control lever member. Because the gripping part is gripped to perform the shifting operation and the braking operation, the braking device can be attached to a drop handlebar. Because the hydraulic fluid pressure generator is inside the gripping part of the housing member and the braking device can be controlled by hydraulic fluid pressure, a bicycle control device can be provided which can perform a braking operation through hydraulic fluid pressure and a shifting operation through a control cable.

In accordance with a second aspect, the bicycle control device according to the first aspect is configured so that the control lever member has a support member that pivotally couples the control lever member to the housing member about the first axis. In this case, the shift-operating mechanism can be provided to the support member of the control lever member.

In accordance with a third aspect, the bicycle control device according to the second aspect is configured so that the shift-operating mechanism is supported on the support member, and the shift-operating mechanism has a cable take-up member pivotally mounted about a second axis different from the first axis. In this case, the shift-operating mechanism can be provided to the support member of the control lever member, and the control cable can be wound around the second axis.

In accordance with a fourth aspect, the bicycle control device according to the third aspect is configured so that the first operation lever of the control lever member is pivotally coupled to the support member about the second axis, and the first operation lever operates the cable take-up member as the first operation lever pivots about the second axis. In this case, both the braking operation and the shifting operation can be performed by the first operation lever of the control lever member.

In accordance with a fifth aspect, the bicycle control device according to any of the second through fourth aspects is configured so that the control lever member includes the control lever member includes a second operation lever pivotally coupled about a second axis to operate the shift-operating mechanism as the second operation lever pivots about the second axis. In this case, the shift-operating mechanism can be activated to perform the shifting operation by pivoting the second operation lever about the second axis, which is different from the braking operation.

In accordance with a sixth aspect, the bicycle control device according to any of the second through fourth aspects is configured so that the control lever member includes a second operation lever pivotally coupled about a third axis to operate the shift-operating mechanism as the second operation lever pivots about the third axis, which is different from the first and second axes. In this case, the shift-operating mechanism can be activated to perform the shifting operation by pivoting the second operation lever about the third axis which is different from the first axis and the second axis, and the shift-operating mechanism can be made more compact.

In accordance with a seventh aspect, the bicycle control device according to any of the second through fourth aspects is configured so that the first operation lever of the control lever member is pivotally coupled to about a second axis to operate the shift-operating mechanism as the first operation lever pivots about the second axis, which is different from the first axis, and the control lever member includes a second operation lever pivotally coupled about a third axis to operate the shift-operating mechanism as the second operation lever pivots about the third axis, which is different from the first and second axes. In this case, the shift-operating mechanism can be activated to perform the shifting operation by pivoting the second operation lever about the third axis which is different from the first axis and the second axis, and the shift-operating mechanism and the control lever member can be made more compact by linking the second operation lever to the first operation lever.

In accordance with an eighth aspect, the bicycle control device according to any of the fifth through seventh aspects is configured so that the second operation lever of the control lever member includes a winding operation lever for performing a winding control operation of the control cable, and a release operation lever for performing a winding release operation of the control cable. In this case, the shifting operation in both shifting directions (the up-shifting direction and the down-shifting direction) of the shifting device can be performed by the two operation levers of the second operation lever of the control lever member, i.e. the winding operation lever and the release operation lever.

In accordance with a ninth aspect, the bicycle control device according to any of the fifth through seventh aspects is configured so that the first operation lever is a winding operation lever for performing a winding control operation of the control cable, and the second operation lever is a release operation lever for performing a winding release control operation of the control cable. In this case, the winding and winding release operations (cable unreeling operation) of the control cable can be performed by the two operation levers.

In accordance with a tenth aspect, the bicycle control device according to any of the third through ninth aspects is configured so that the first axis and the second axis are not parallel. In this case, because the first axis and the second axis are disposed in different directions, the braking operation and the shifting operation can be distinguished, and the braking operation and the shifting operation can be reliably performed.

In accordance with an eleventh aspect, the bicycle control device according to any of the third through tenth aspects is configured so that the first axis being substantially perpendicular to the traveling direction of the bicycle when the bicycle control device is mounted on a bicycle in an installed position. The second axis is substantially parallel to the traveling direction of the bicycle. In this case, the braking operation of the first operation lever can be performed in the same manner as the usual brake lever operation.

In accordance with a twelfth aspect, the bicycle control device according to any of the first through eleventh aspects is configured so that the hydraulic fluid pressure generator generates hydraulic fluid pressure by operating the piston in a direction of inserting into the cylinder. In this case, because hydraulic fluid pressure is generated by the piston being pushed and inserted into the cylinder by the operation of the first operation lever, fluid does not flow into the link between the first operation lever and the cylinder. Therefore, the amount of packing for the seal can be reduced.

In accordance with a thirteenth aspect, the bicycle control device according to any of the first through twelfth aspects is configured so that the hydraulic fluid pressure generator generates hydraulic fluid pressure by operating the piston in a direction of pulling out of the cylinder. In this case, because hydraulic fluid pressure is generated by the piston being pulled and withdrawn out of the cylinder by the operation of the first operation lever, only tension acts on the linking portion between the piston and the first operation lever. Therefore, buckling no longer occurs in the rod, the linking portion can be made less rigid, and the weight of the linking portion can be reduced.

In accordance with a fourteenth aspect, the bicycle control device according to any of the first through thirteenth aspects is configured so that the hydraulic fluid pressure generator has a rod coupled to the piston and operated by the first operation lever. In this case, the movement of the piston is smooth because the cylinder and the first operation lever are coupled by the rigid rod.

In accordance with a fifteenth aspect, the bicycle control device according to any of the first through fourteenth aspects is configured so that the hydraulic fluid pressure generator further has a reservoir coupled to the cylinder, and the reservoir storing fluid for generating hydraulic fluid pressure. In this case, even when a friction member of the braking device becomes worn and a greater amount of fluid is needed, the necessary amount of fluid can be poured in by the reservoir, and the hydraulic fluid pressure does not change even if the temperature of the fluid changes. It is therefore possible to prevent changes in braking characteristics caused by wear in the friction members or changes in fluid temperature.

In accordance with a sixteenth aspect, the bicycle control device according to any of the first through fifteenth aspects is configured so that the hydraulic fluid pressure generator further includes a return spring urging the piston in a direction opposite to a hydraulic fluid pressure generating operation direction performed by the first operation lever. The return spring is provided inside the cylinder. In this case, when the hydraulic fluid pressure generating operation by the first operation lever is ended, the piston can be returned to the position prior to the braking operation.

In accordance with a seventeenth aspect, the bicycle control device according to any of the first through sixteenth aspects is configured so that the cylinder is provided inside the housing member. In this case, because the cylinder is provided inside the housing member which has comparatively excessive space, the shape of the housing member does not deform readily in a housing member of a bicycle control device braked by a normal control cable, despite the cylinder being provided.

In accordance with an eighteenth aspect, the bicycle control device according to any of the first through seventeenth aspects is configured so that the cylinder is provided integrally to the housing member. In this case, the cylinder is provided integrally to the housing member, and the costs of manufacturing and attaching the cylinder can be reduced.

According to the present invention, because the shifting operation and the braking operation can be performed by gripping the gripping part, the bicycle control device can be attached to the drop handlebar. It is also possible to provide a bicycle control device in which the braking operation can be performed by hydraulic fluid pressure and the shifting operation can be performed by a control cable, because the hydraulic fluid pressure generator is inside the gripping part of the housing member and the braking device can be controlled by hydraulic fluid pressure.

Furthermore, it is possible to provide a bicycle control device in which the hydraulic fluid pressure generator is readily configured inside the housing member, and particularly inside the gripping part, by providing the shift-operating mechanism to the control lever member.

Also other objects, features, aspects and advantages of the disclosed bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
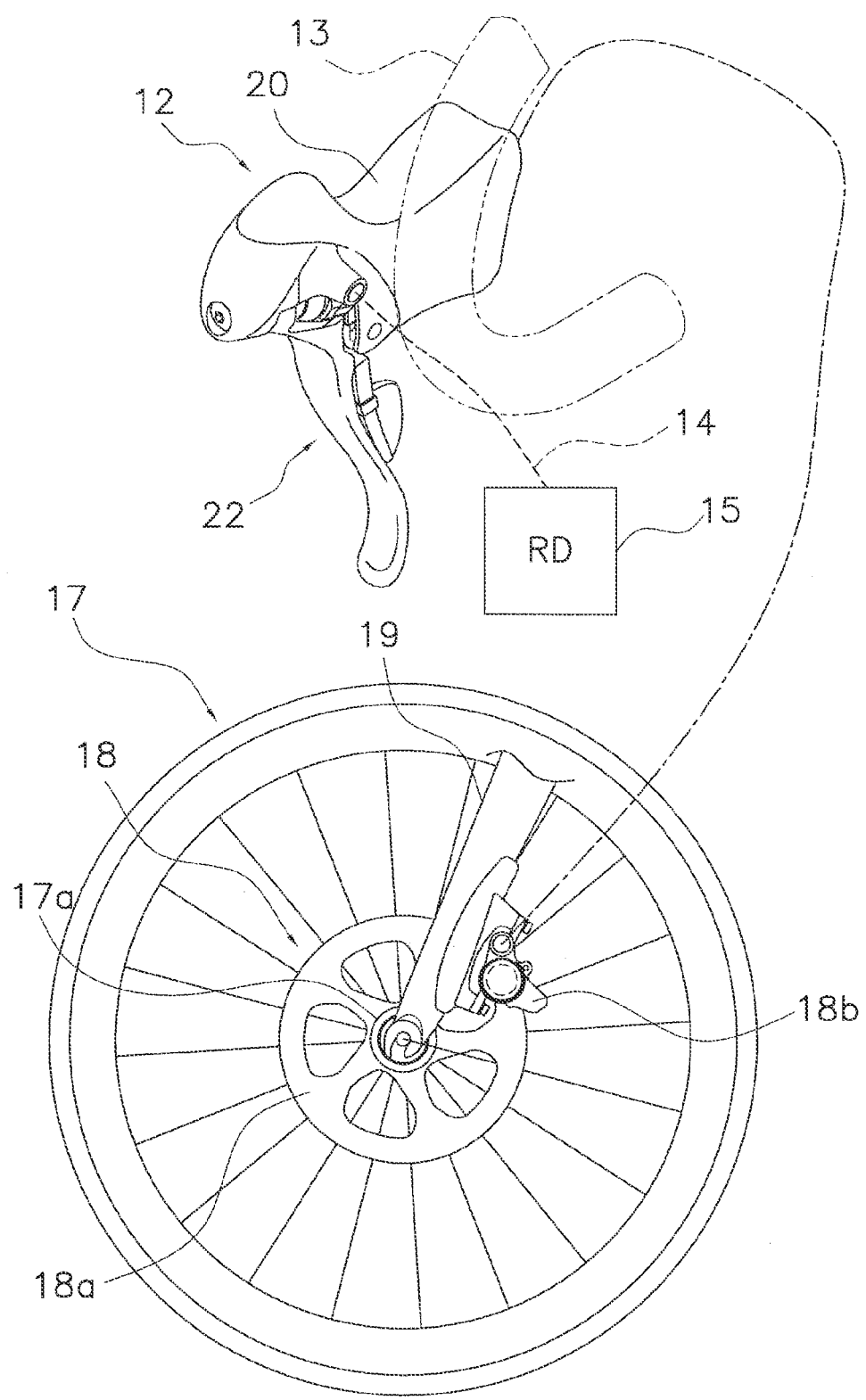
FIG. 1 is a perspective view of a bicycle control device mounted to a portion of a drop handlebar according to a first embodiment, a side elevational view of a front portion of a bicycle with a bicycle braking device controlled by the bicycle control device and a schematic view of a rear derailleur controlled by the bicycle control device.

Referring initially to FIG. 1, a perspective view of a bicycle control device 12 that is mounted to a portion of a drop handlebar 13 according to a first embodiment. Here, only the bicycle control device 12 on the right side of the drop handlebar 13 is shown in FIG. 1. However, it will be apparent that the left side of the drop handlebar 13 has a similar bicycle control device that includes the features of the bicycle control device 12 as discussed herein.

A shift cable 14 acting as a control cable connects the right bicycle control device 12 to a rear derailleur 15. The shift cable 14 is a Bowden cable having an inner cable and an outer casing. A hydraulic fluid pressure hose 16 connects the right bicycle control device 12 to a braking device 18 for braking a front wheel 17. The braking device 18 is a hydraulic fluid pressure disc brake device which is actuated by hydraulic fluid pressure. The braking device 18 includes a brake disc 18a and a caliper 18b. The brake disc 18a is fixedly attached in an integrally manner to a hub 17a of the front wheel 17 so as to rotate with the front wheel 17. The caliper 18b is fixed to a front fork 19 of the bicycle. The caliper 18b brakes or slows the rotation of the front wheel 17 by squeezing the brake disc 18a upon being actuated by the right bicycle control device 12. The left control device (not shown) is coupled to a front derailleur via a shift cable (both not shown), and is also coupled to a braking device of a rear wheel (not shown), for example, via a hydraulic fluid pressure hose. The front derailleur and the rear derailleur 15 are examples of shifting devices. The right-side control device 12 and the left-side braking device (not shown) are mirror images of one another, and except for having different numbers of shift positions, the structure and operation of the bicycle control devices are substantially identical. Thus, only the right-side control device 12 will be described and illustrated in detail herein. In the following description, the bicycle control device is referred to simply as the control device.

Because a majority of the components of the bicycle are conventionally known in the relevant art, details relating to the components of the bicycle are not described or illustrated herein, except for components pertinent to the control device 12 of the present invention. Furthermore, various components of a conventional bicycle not illustrated or described herein, including braking devices, shifting devices, sprockets, and the like, can also be used together with the control device 12 according to the present invention.

Figure 2:
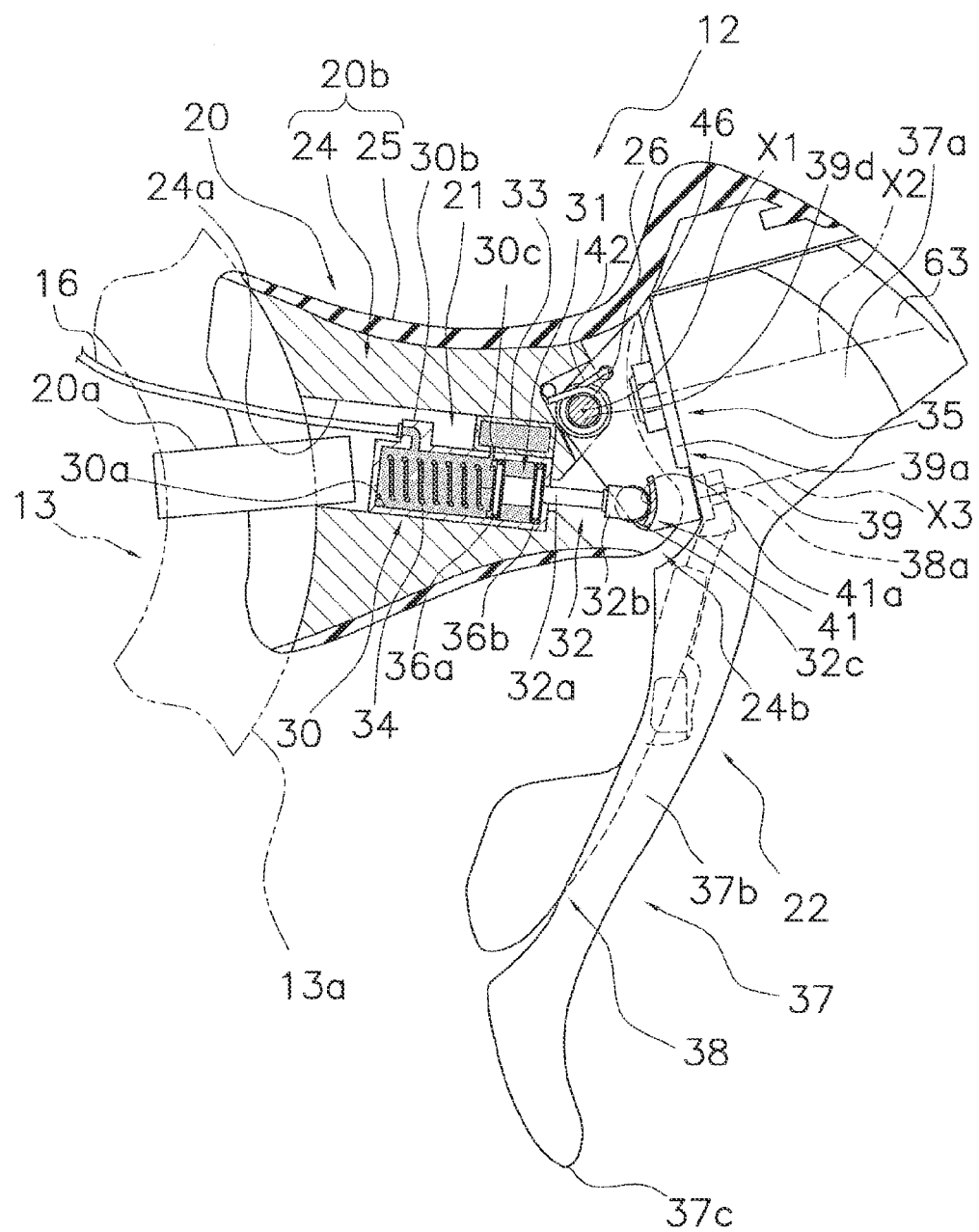
FIG. 2 is a partial cross sectional view of the bicycle control device according to the first embodiment.
Figure 4:
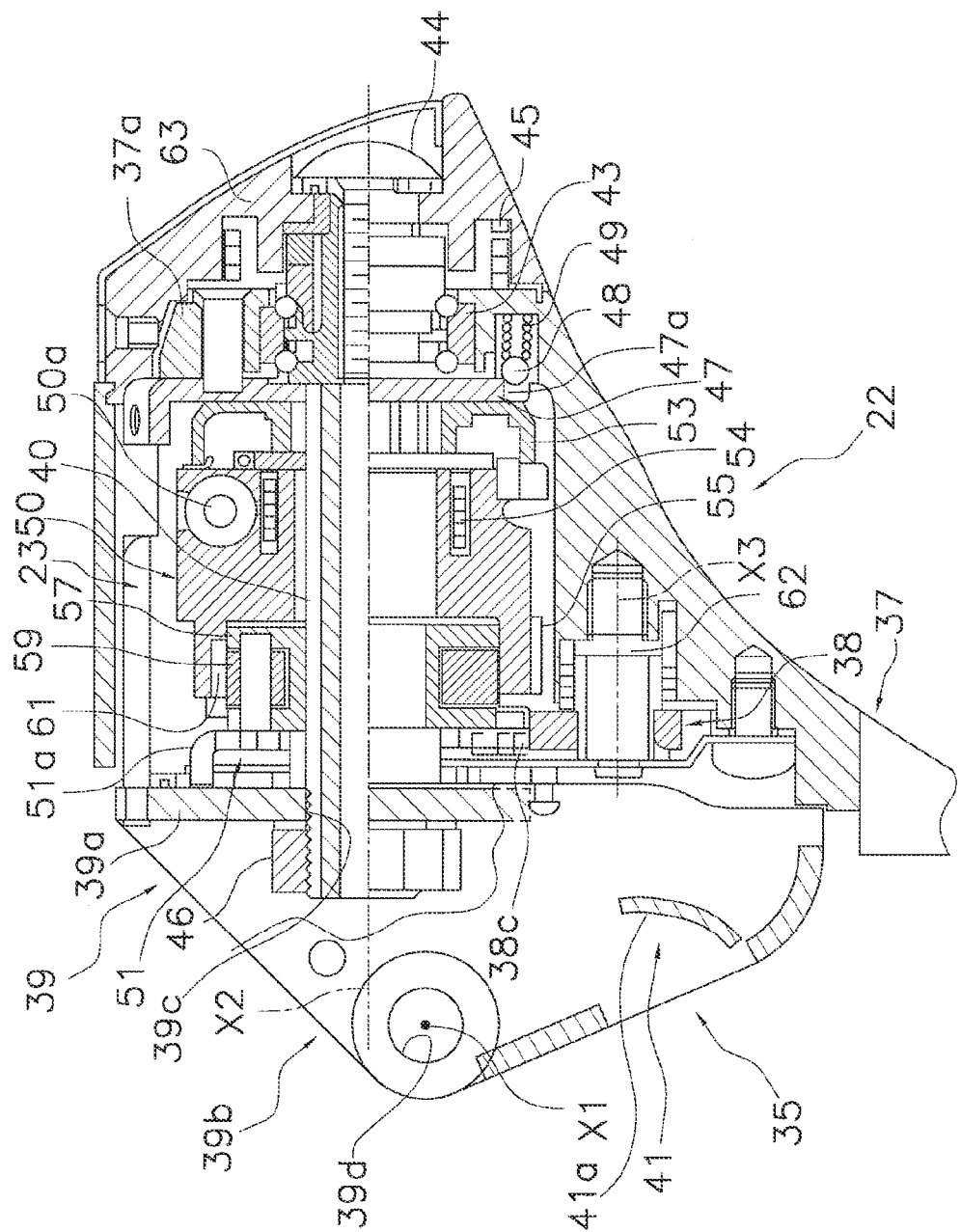
FIG. 4 is an enlarged cross sectional view of the shift-operating mechanism of the bicycle control device according to the first embodiment.

As shown in FIGS. 1, 2 and 4, the control device 12 includes a housing member 20, a hydraulic fluid pressure generator 21, a control lever member 22 and a shift-operating mechanism 3 (see FIG. 4). The housing member 20 basically has an attachment part 20a and a grip part 20b. The attachment part 20a is capable of being attached to a curved part 13a that formed in the end of the drop handlebar 13 of the bicycle. The grip part 20b is provided with the attachment part 20a, and is configured to be gripped by a rider during riding. The attachment part 20a is a conventionally-known band-shaped member, and the control device 12 can be fixed to the drop handlebar 13 by fastening the attachment part 20a by a screw.

The grip part 20b has a main grip body 24 and a cover member 25. The main grip body 24 is made of a synthetic resin such as a polyamide resin or a metal such as aluminum. The cover member 25 is made of an elastic piece that covers the outside surface of the main grip body 24.

The top or upper surface of the main grip body 24 has a downward-curving shaped surface to facilitate gripping of the grip part 20b by hand. The main grip body 24 has an accommodating space 24a and a pair of left and right first brackets 24b. The accommodating space 24a is dimensioned for internally accommodating the hydraulic fluid pressure generator 21 in a detachable manner. Each of the left and right first brackets 24b has a hole or bore that a lever spindle 26. Thus, the lever spindle 26 is mounted to the main grip body 24 for pivotally supporting the control lever member 22 to the housing member 20. When the control device 12 is mounted on the drop handlebar 13 of the bicycle, the lever spindle 26 is extends in a left-to-right direction, which is substantially perpendicular to a travel direction in which the bicycle travels. The center core of the lever spindle 26 defines a first axis X1. The accommodating space 24a is formed as a cylindrically shaped space defined by a cylinder and has a circle shaped opening as viewed from the rear of the main grip body 24 along the longitudinal axis of the accommodating space 24a in the first embodiment. The rear surface of the main grip body 24 is curved so as to conform to the curved part 13a of the drop handlebar 13.

Figure 3:
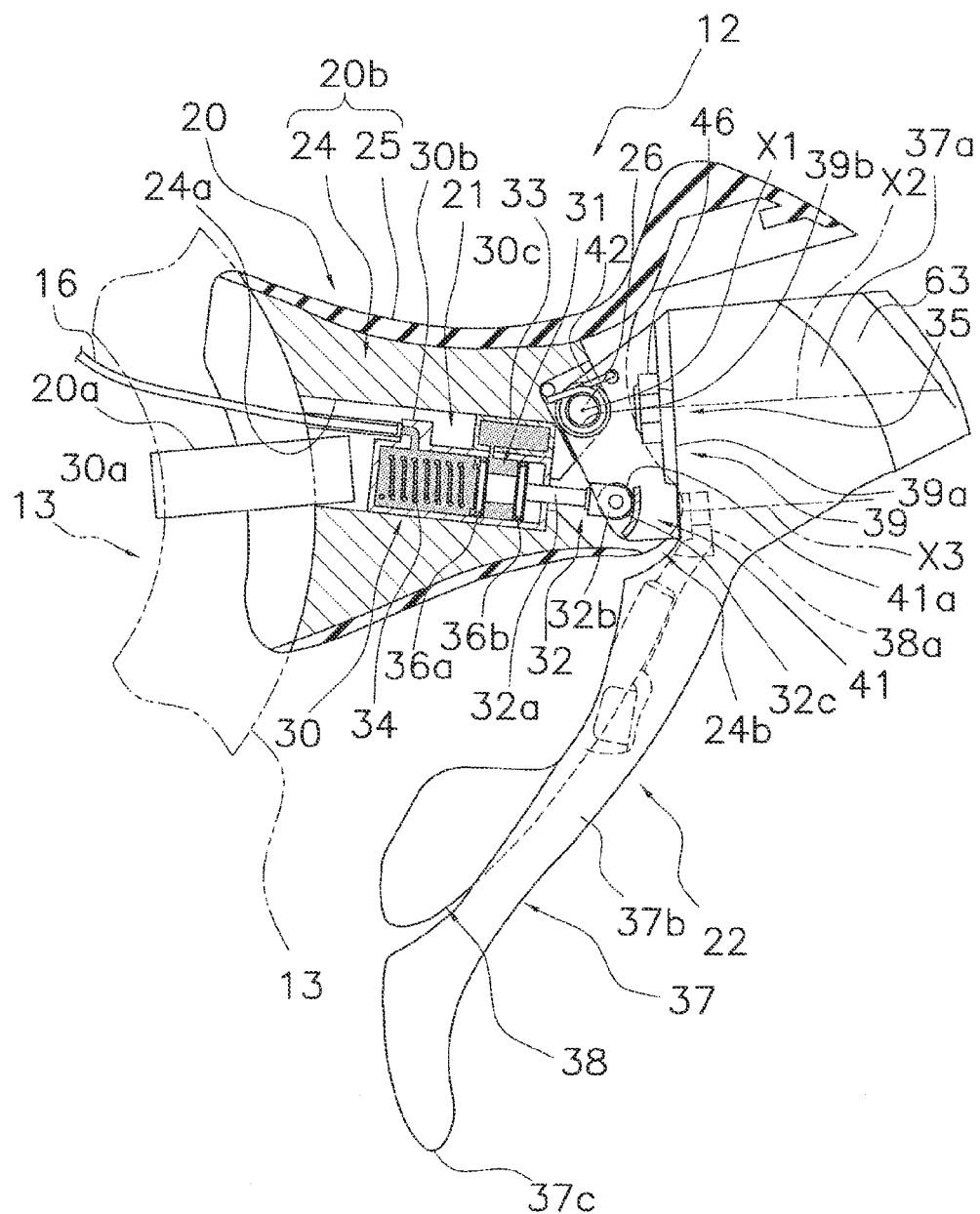
FIG. 3 is a partial cross sectional view, similar to FIG. 2, of the bicycle control device according to the first embodiment when the bicycle control device is operated to perform a braking operation of the bicycle braking device.

The hydraulic fluid pressure generator 21 is provided in order to impart hydraulic fluid pressure to the braking device 18 and cause the braking device 18 to brake, as shown in FIG. 3. The hydraulic fluid pressure generator 21 includes a cylinder 30, a piston 31, a rod 32, a reservoir 33 and a first return spring 34. The cylinder 30 is completely disposed in the accommodating space 24a. The piston 31 moves linearly within the cylinder 30 (i.e., reciprocates linearly within the cylinder 30). The rod 32 is mechanically coupled to the piston 31. The reservoir 33 fluidly coupled to the cylinder 30. The first return spring 34 is disposed in the cylinder 30 and biases the piston 31 towards a non-braking position.

The hydraulic fluid pressure generator 21 of the first embodiment generates hydraulic fluid pressure for performing a braking operation by a rider operating the control lever member 22 to move the piston 31 within the cylinder 30 in a direction that compress the first return spring 34. The cylinder 30 has a movement space 30a through which the piston 31 moves. The cylinder 30 further includes a first port 30b and a second port 30c. The first port 30b is configured and arranged for supplying pressure fluid to the braking device 18. The second port 30c is configured and arranged for fluidly connecting the movement space 30a with the reservoir 33. The first port 30b is disposed in the rear of the cylinder 30. The hydraulic fluid pressure tube 16 has a first end that is a connected to the braking device 18, and a second end that is connected to the first port 30b.

A first seal member 36a and a second seal member 36b are mounted to both ends of the external peripheral surface of the piston 31. The first seal member 36a and the second seal member 36b are in the form of O-rings, for example. The first seal member 36a and the second seal member 36b are provided in order to seal the gaps between the internal peripheral surface of the movement space 30a of the cylinder 30 and the external peripheral surface of the piston 31. A single seal member may also be used. The piston 31 moves through the movement space 30a between a first position, which is disposed at the tip of the cylinder 30 as shown in FIG. 2, and a second position, which is pushed farther along the cylinder 30 than the first position as shown in FIG. 3, in accordance with the braking operation of the control lever member 22. The first position corresponds to a rest position and the second position corresponds to an operated or braking position. The second port 30c is disposed nearer the first port 30b than the first seal member 36a when the piston 31 is disposed in the first position. The second port 30c is also disposed between the first seal member 36a and the second seal member 36b when the piston 31 is disposed in the second position. The first port 30b is disposed farther to the rear than the first seal member 36a when the piston 31 is disposed in the second position.

The rod 32 is pushed into the cylinder 30 in accordance with the control lever member 22 being operated in the braking direction. The rod 32 has a rod main body 32a is integrally provided to the piston 31. The rod 32 has a double clevis 32b that is fixed to a tip of the rod main body 32a. A roller 32c is rotatably mounted to the clevis 32b. The roller 32c is pushed by a pushing member 41, described hereinafter. The pushing member 41 is provided on the control lever member 22.

The reservoir 33 is capable of storing fluid (e.g. oil) far generating hydraulic fluid pressure. When a friction member of the braking device becomes worn and a greater amount of fluid is needed, the necessary amount of fluid can be provided from the reservoir 33, which is also provided in order to prevent fluctuations in the pressure imparted to the braking device 18 by expansion and contraction caused by changes in the fluid temperature. In this embodiment, the reservoir 33 is fixed to the cylinder 30 and interconnected with the cylinder 30 by the first port 30b. However, the reservoir 33 may be integrally formed with the cylinder 30.

The first return spring 34 is a coil spring, for example, and is an example of a piston return spring. The first return spring 34 is provided inside the cylinder 30. With the first return spring 34 in a compressed state, the first return spring 34 has a first end in contact with an end surface of the piston 31 on the side opposite side where the rod 32 is fixed. The first return spring 34 urges the piston 31 in a direction (to the right in FIG. 2), which is opposite that of the hydraulic fluid pressure generating operation direction of the control lever member 22. Specifically, the piston 31 is urged toward the first position.

The control lever member 22 and the shift-operating mechanism 23 are essentially activated by the same method as described in U.S. Pat. No. 6,212,078 (assigned to Shimano Inc.). Therefore, descriptions relating to the detailed structures and actions of the control lever member 22 and the shift-operating mechanism 23 are omitted herein for the sake of brevity.

As shown in FIGS. 2 to 4, the control lever member 22 includes a support member 35, a first operation lever 37 and a second operation lever 38. The support member 35 is coupled to the lever spindle 26 that is disposed in the housing member 20. The support member 35 is pivotally mounted on the lever spindle 26 to pivot about the first axis X1. In particular, the support member 35 pivots about the first axis X1 from an initial position shown in FIG. 2 to a swung position shown in FIG. 3. The support member 35 is urged to an initial position by a second return spring 42. Here, the support member 35 is illustrated in the form of a torsion coil spring wound around the periphery of the lever spindle 26. One end of the second return spring 42 is engaged with the first brackets 24b of the main grip body 24, while the other end is engaged with a second bracket 39, described hereinafter, of the support member 35.

The support member 35 includes the second bracket 39, which has a fixing plate 39a and a pair of mounting plates 39b. The mounting plates 39b are bent from both ends of the fixing plate 39a to form a U-shaped bracket. As seen in FIG. 4, a first support spindle 40 is fixed to the fixing plate 39a. Preferably, a pushing member 41 is fixedly mounted between the pair of mounting plates 39b. A first through-hole 39c is formed in the fixing plate 39a. The first support spindle 40 passes through the first through-hole 39c. Each of the mounting plates 39b has a second through-hole 39d through which the lever spindle 26 passes. Thus, the mounting plates 39b are pivotally supported on the lever spindle 26. The first support spindle 40 is disposed along a direction that is not parallel with the first axis X1 (a crisscrossing direction, for example). In particular, the first support spindle 40 has a center longitudinal axis that defines a second axis X2. The second axis X2 is substantially parallel to the travel direction in which the bicycle travels. The first support spindle 40 is fixed to the fixing plate 39a of the support member 35 of the control lever member 22 by a nut 46 that is threaded on the end of the first support spindle 40 which extends through the first through-hole 39c. Specifically, the end of the first support spindle 40 extends through the first through-hole 39c of the fixing plate 39a of the second bracket 39 so that the shift-operating mechanism 23 is fixed in place.

The second through-holes 39d are disposed higher than the pushing member 41. The pushing member 41 has a curved surface 41a. The curved surface 41a is formed by a plurality of connected arcs in a portion that contacts the roller 32c on the end of the rod 32. With the is configuration, the curved surface 41a enables the rod 32 to be pushed in the axial direction regardless of the swung position of the control lever member 22.

Figure 5:
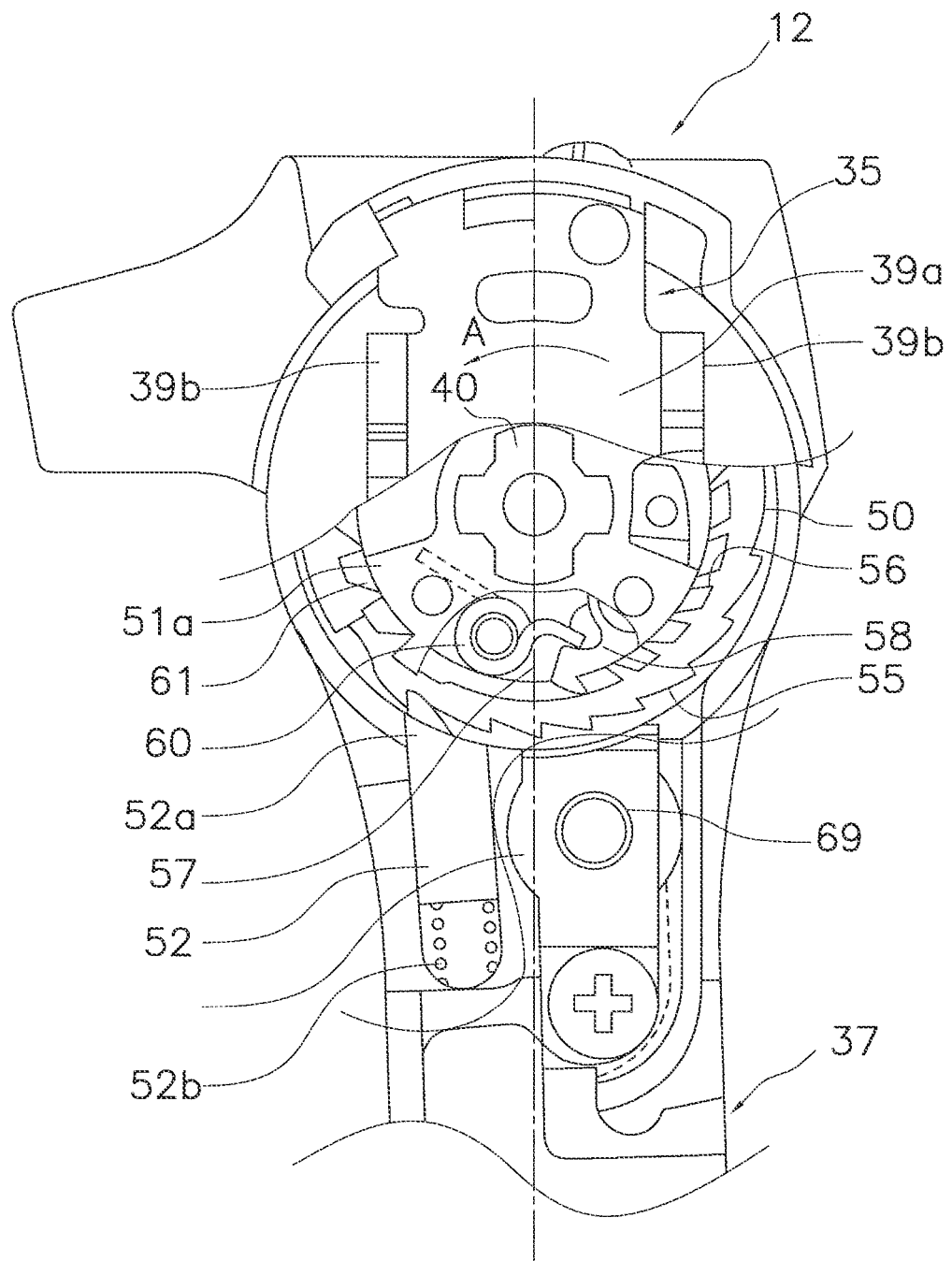
FIG. 5 is a rear elevational view of the shift-operating mechanism illustrated in FIG. 4, with a portion of the shift-operating mechanism of the bicycle control device removed for purposes of illustration.

As shown in FIGS. 4 and 5, the first operation lever 37 is coupled together with the support member 35 to the lever spindle 26 so as to be capable of pivoting about the first axis X1. The curved surface 41a is also coupled to the first support spindle 40 so as to be capable of pivoting about the second axis X2, as well as being provided for the previously described braking operation and a shifting operation of the rear derailleur 15 in one direction. The first operation lever 37 is controllably coupled to the shift-operating mechanism 23 so as to operate a cable take-up member 50 of the shift-operating mechanism 23 by the operation of pivoting about the second axis X2, and to up-shift (or down-shift) the rear derailleur 15 by winding, i.e. pulling the shift cable 14. The braking device 18 is braked by the generation of hydraulic fluid pressure by the pivoting operation of the first operation lever 37 about the first axis X1.

In the present example, the second operation lever 38 is coupled to the second support spindle 62 so as to be capable of pivoting about the third axis X3, which is different from the first and second axes X1 and X2. The third axis X3 is substantially parallel with the second axis X2. The second support spindle 62 is fixed to the first operation lever 37 along the third axis X3, and the second operation lever 38 is provided for the shifting operation of the rear derailleur 15 in the other direction. The second operation lever 38 is controllably coupled to the shift-operating mechanism 23 so as to downshift (or up-shift) the rear derailleur 15 by unwinding, i.e. releasing the shift cable 14.

As shown in the other examples, the second operation lever 38 may be coupled to the support member 35 so as to be capable of pivoting about the second axis X2. The second operation lever 38 may also be coupled to the second support spindle 62 so as to be capable of pivoting about the third axis X3, which is different from the first and second axes X1 and X2, and substantially parallel with the second axis X2. In this case, the second support spindle 62 is fixed to the support member 35 along the third axis X3.

In the present example, the shift-operating mechanism 23 is essentially actuated either by turning the first operation lever 37 about the second axis X2 of the first support spindle 40, or by turning the second operation lever 38 about the third axis X3 of the second support spindle 62. The third axis X3 of this embodiment is substantially parallel to the second axis X2.

As shown in FIG. 2, the first operation lever 37 has a mounting end portion 37a, a shifting operation portion 37b and a free end portion 37c. The mounting end portion 37a of the first operation lever 37 is pivotally coupled to the first support spindle 40 so as to move about the second axis X2 between an initial position and a shifting position. The shifting operation portion 37b extends downward from the tip portion of the housing member 20. The first operation lever 37 is an example of a cable winding lever.

The second operation lever 38 is pivotally attached to the first operation lever 37 between the mounting end portion 37a of the first operation lever 37 and the shifting operation portion 37b of the first operation lever 37. As previously described, the second operation lever 38 is controllably coupled to the shift-operating mechanism 23 so as to release the shift cable 14. The second operation lever 38 is an example of a cable release lever.

The shift-operating mechanism 23 is pivotally coupled to the housing member 20 by the support member 35. The shift-operating mechanism 23 has at least a cable take-up member 50. In the present embodiment, the winding rotation axis of the cable take-up member 50 is defined as the second axis X2.

The mounting end portion 37a of the first operation lever 37 is mounted to the first support spindle 40, which is rotatably supported via a bearing assembly 43 (see FIG. 4). The bearing assembly 43 and the mounting end portion 37a of the first operation lever 37 are detachably mounted to the first support spindle 40 by a fixing screw 44. The fixing screw 44 also attaches an outer cap unit 63 to the mounting end portion 37a of the first operation lever 37. The first operation lever 37 turns about the second axis X2 which extends in a direction crisscrossing the first axis X1. Thus, the first operation lever 37 is controllably coupled to the shift-operating mechanism 23 so as to turn about the second axis X2. Specifically, for the purpose of shifting, the first operation lever 37 pivots in a direction perpendicular to the direction in which the first operation lever 37 moves for braking.

A third return spring 45 is attached on the fixing screw 44. One end of the third return spring 45 is engaged with the mounting end portion 37a of the first operation lever 37, and the other end of the third return spring 45 is engaged with an outer cap unit 63 fixed to the first support spindle 40 so that rotation is halted by the fixing screw 44. The third return spring 45 exerts urging force on the first operation lever 37 in a first rotational direction shown by the arrow A in FIG. 5, so as to urge the first operation lever 37 from the shifting position to a reference stationary position.

As shown in FIG. 4, a fixing plate 47 is attached adjacent to the tip of the housing member 20 so as to be incapable of relative rotation. The fixing plate 47 is provided with a groove 47a. The mounting end portion 37a comprises a ball 48 disposed adjacent to the vicinity thereof and engaged in the groove 47a, and a lever positioning spring 49 for urging the ball 48 toward the groove 47a. By this structure, the first operation lever 37 is held in a neutral position in contraposition to the most distal end of the curved portion of the drop handlebar 13, and the first operation lever 37 is prevented from pivoting along with the second operation lever 38 when the second operation lever 38 is operated.

Referring to FIGS. 4 and 5, in addition to the cable take-up member 50, the shift-operating mechanism 23 further comprises a position holding mechanism 51, a transmission member 52 and a shift position sensor 53. The position holding mechanism 51 is formed by the second operation lever 38 and a release or control plate 51a. The transmission member 52 is coupled to the first operation lever 37. The shift position sensor 53 is disposed between the mounting end portion 37a and the cable take-up member 50. The shift position sensor 53 is used in order to detect the positions of currently engaged gears. As shown in the drawings, the shift position sensor 53 is a potentiometer.

The cable take-up member 50 of the shift-operating mechanism 23 comprises a shift cable mounting part 50a to which a cable nipple (not shown), which is fixed to an end of an inner cable of the shift cable 14 is mounted. The cable take-up member 50 has a substantially cylindrical shape. The cable take-up member 50 rotates about the second axis X2, which is the winding rotational axis of the inner cable, and winds the inner cable.

The cable take-up member 50 is usually urged in the unwinding direction by a fourth return spring 54. Specifically, the fourth return spring 54 is configured and arranged so as to exert urging force in a first rotational direction, so that the cable take-up member 50 is rotated in the unwinding direction. The cable take-up member 50 further comprises a plurality of drive teeth 55 disposed on an external peripheral surface, and a plurality of engaging teeth 56 disposed on an internal peripheral wall.

The transmission member 52 comprises an engaging protuberance 52a at the tip. The transmission member 52 is urged by a spring 52b that is disposed in a groove of the first operation lever 37, so as to push against the drive teeth 55 of the cable take-up member 50. Therefore, when the first operation lever 37 is turned about the second axis X2, the cable take-up member 50 rotates against the spring force of the fourth return spring 54 as a result.

The first support spindle 40 non-rotatably supports a pawl support main body 57, which pivotally supports a return pawl 58 and a positioning pawl 59. A spring 60 is provided so as to urge the return pawl 58. Another spring (not shown) is provided so as to urge the positioning pawl 59 in a direction away from control grooves 61 formed in the internal peripheral surface of the cable take-up member 50.

The second operation lever 38 is pivotally connected to the mounting end portion 37a by the second support spindle 62. The second operation lever 38 comprises a control protuberance 38c protruding from the near end thereof in a direction opposite of a mounting end portion 38a. The control protuberance 38c engages with a control plate 51a supported on the first support spindle 40. The movement of the second operation lever 38 causes the control plate 51a to be rotated and the cable take-up member 50 to thereby be released, and as a result, the cable take-up member 50 is rotated in the unwinding direction by the fourth return spring 54.

The control plate 51a comprises an engaging protuberance for engaging with both the return pawl 58 and the positioning pawl 59, so that when the second operation lever 38 is swung laterally, the return pawl 58 is moved in a direction out of being engaged and the positioning pawl 59 is moved to an engaged position. The control plate 51a further comprises a first cam surface in contact with the engaging protuberance 52a, and a second cam surface which engages with the control protuberance 38c. The control plate 51a, the return pawl 58, and the positioning pawl 59 function and operate by the same manner as the corresponding members of the fourth embodiment disclosed in U.S. Pat. No. 5,241,878 (assigned to Shimano Inc.). Through this configuration, shifting is achieved by the pivoting motion in a direction perpendicular to the direction of the turning motion of the first operation lever 37.

The second operation lever 38 is disposed in a groove located in the rear surface of the mounting end portion 37a. To make operation easier, the mounting end portion 38a of the second operation lever 38 is disposed near the first operation lever 37 and made to protrude toward the drop handlebar 13 relative to the mounting end portion 37a. The second operation lever 38 has an initial position where one side surface of the second operation lever 38 is in contact with a side surface of the groove of the mounting end portion 37a.

With the first operation lever 37 of the illustrated embodiment, the first operation lever 37 can be turned to the braking position while the curved portion of the drop handlebar 13 or the housing member 20 is gripped by hand. The first operation lever 37 turns about the first axis X1. The piston 31 of the hydraulic fluid pressure generator 21 is pushed to generate hydraulic fluid pressure in the cylinder 30 by this turning of the first operation lever 37, the braking device is activated by the hydraulic fluid pressure, and the bicycle is braked. The first operation lever 37 is capable of turning about the second axis X2 and pivoting laterally from the stationary position in order to down-shift the speed step to a lower speed, for example, and when the lever is released, the lever is returned to the stationary position by the spring force of the fourth return spring 54. The second operation lever 38 is capable of pivoting laterally from the stationary position in order to up-shift the speed step to a higher speed, for example, and when the lever is released, the lever is returned to the stationary position by the spring force of the spring urging the return pawl 58 and the spring urging the positioning pawl 59.

When the first operation lever 37 is swung laterally while the transmission member 52 is engaged with one cable of the drive teeth 55, the transmission member 52 drives the cable take-up member 50 and the return pawl 58 separates from the engaging teeth 56. As a result, the inner cable of the shift cable 14 is pulled and the selected up-shift speed is achieved. When the first operation lever 37 is released, the first operation lever 37 is returned to the initial position by the spring force of the third return spring 45.

When the second operation lever 38 is turned about the third axis X3, which is different from the first and second axes and substantially parallel with the second axis X2, and the second operation lever is swung laterally from the stationary position, the control plate 51a is driven via the control protuberance 38c. Next, the engaging protuberance of the control plate 51a pushes the positioning pawl 59 in the direction of the control grooves 61, and the tip of the positioning pawl 59 fits into one of the control grooves 61. The engaging protuberance of the control plate 51a also moves in a direction of removing the return pawl 58 from the engagement with an engaging tooth 56. As a result, the cable take-up member 50 is returned across the gap between the positioning pawl 59 and the control groove 61, i.e. a distance corresponding to one pitch of the engaging teeth 56 or less. When the second operation lever 38 is released so as to return, the control plate 51a rotates, the positioning pawl 59 is removed from the engagement with the control groove 61, and the return pawl 58 moves until it engages with the adjacent engaging tooth 56.

When the first operation lever 37 is swung in order to shift speeds, the second operation lever 38 pivots together with the first operation lever 37 instead of moving relative to the first operation lever 37. The first operation lever 37 can thereby pivot without being hindered by the second operation lever 38.

The first operation lever 37 of the illustrated embodiment previously described can be swung in the turning direction of the first operation lever 37, i.e. in a direction perpendicular to the axial direction of a braking turning axis P. Alternatively, the first operation lever 37 may pivot in a direction inclined relative to the braking turning axis P. This objective may be achieved by pivoting the first operation lever 37 in a different direction from which the first operation lever 37 turns, as long as the pivoting is within a range that does not cause shifting to occur during braking.

While holding the lowest position on the curved portion of the drop handlebar 13, the rider can extend their middle and index fingers of the hand gripping the curve portion and hook these fingers over the first operation lever 37 to pull the first operation lever 37 toward the braking position, i.e. toward the curved portion. This lever operation causes the shift-operating mechanism 23 to turn about the first axis X1 together with the base member 31. This turning movement of the first operation lever 37 generates hydraulic fluid pressure and applies a brake to the bicycle.

Second Embodiment

Figure 6:
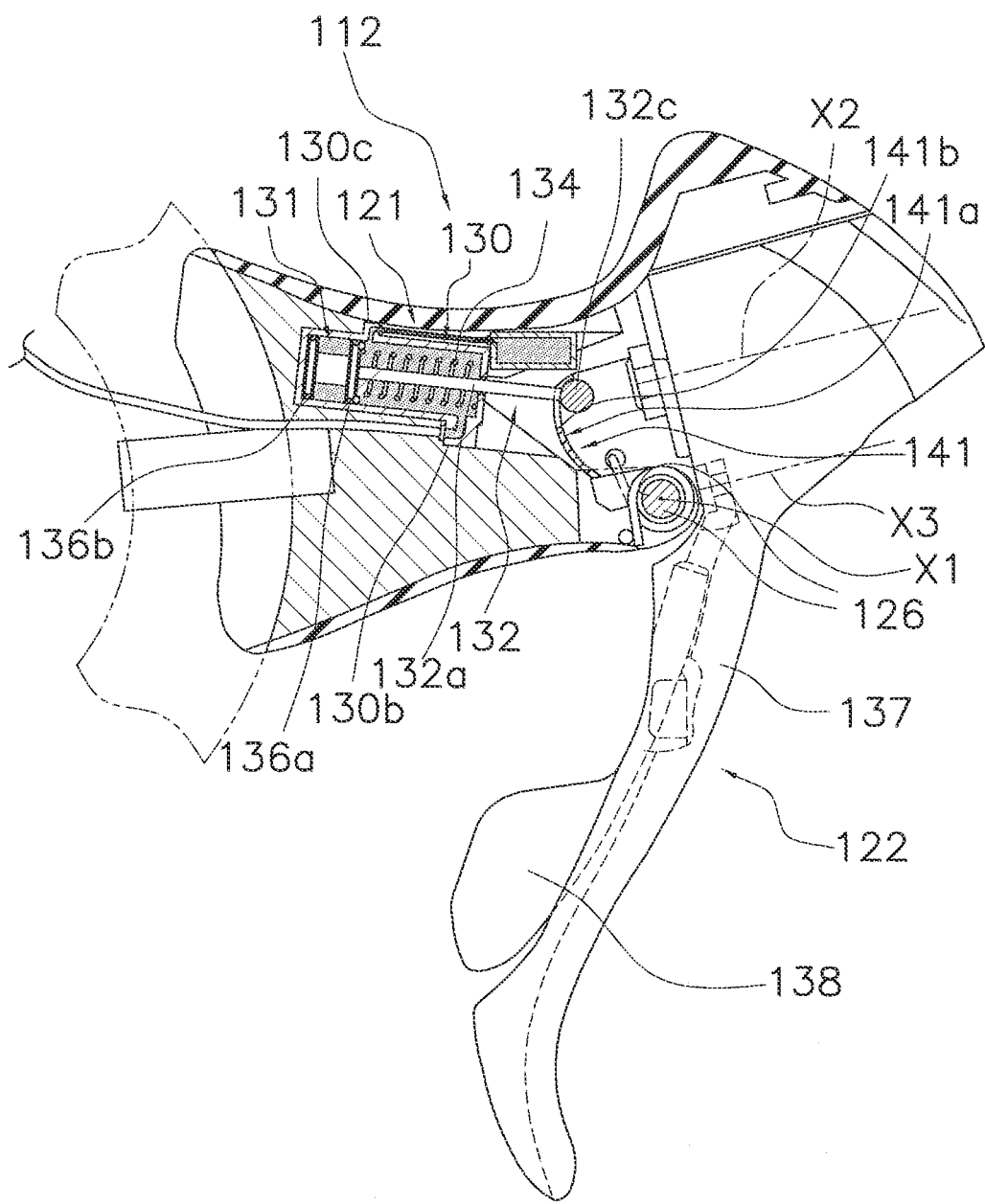
FIG. 6 is a partial cross sectional view, similar to FIG. 2, of the bicycle control device according to a second embodiment.

Referring now to FIG. 6, a control device 112 in accordance with a second embodiment will now be discussed. In the following description, only configurations different from the first embodiment are described and denoted by symbols in the drawings, and other configurations similar to those of the first embodiment are not described in configuration or action and are not denoted by symbols in the drawings.

Figure 7:
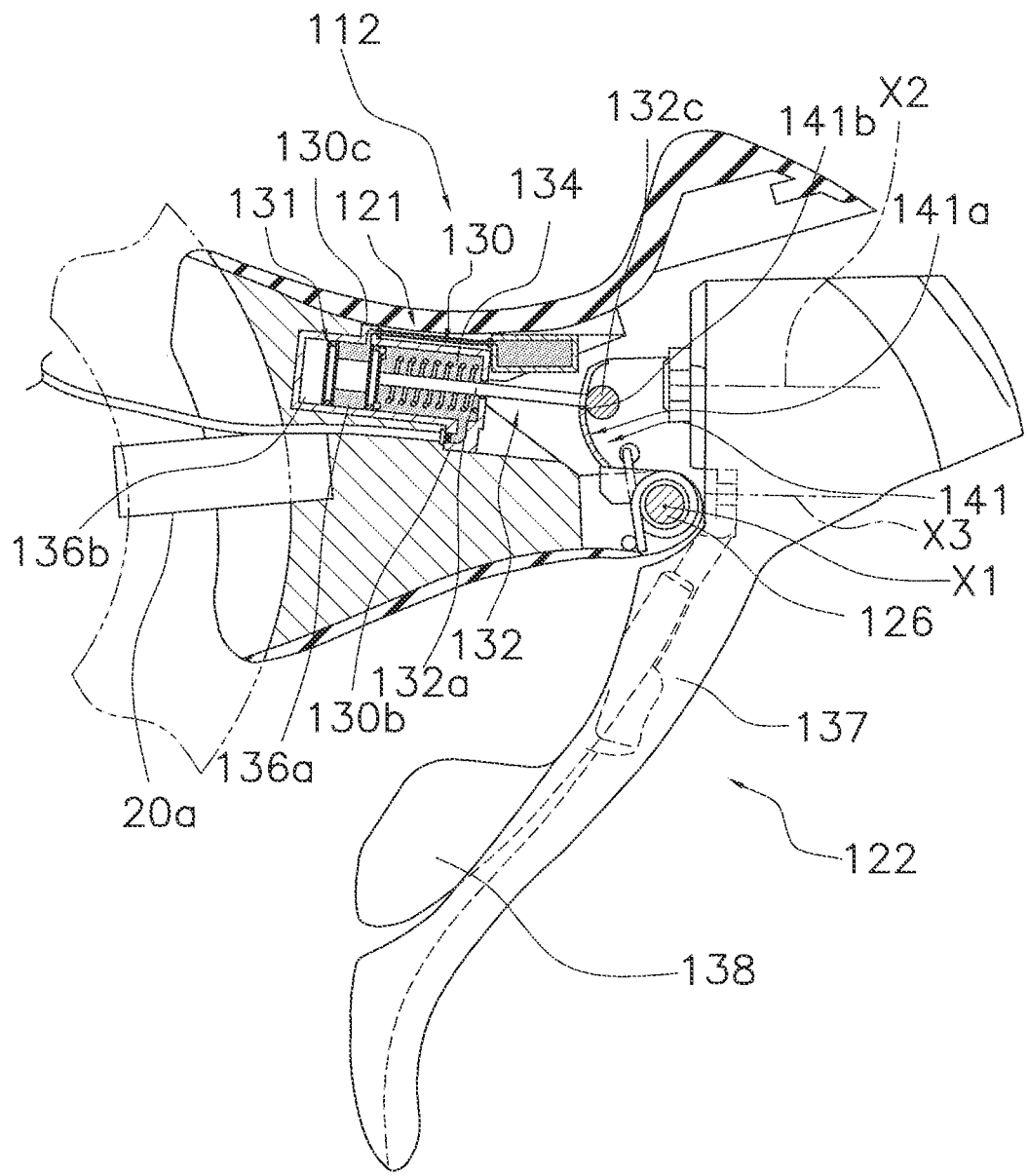
FIG. 7 is a partial cross sectional view, similar to FIG. 3, of the bicycle control device according to the second embodiment of FIG. 6, when the bicycle control device is operated to perform a braking operation of the bicycle braking device.

Here in the second embodiment, the control device 112 has a hydraulic fluid pressure generator 121 that includes a cylinder 130, a piston 131 and a rod 132. In the first embodiment, the hydraulic fluid pressure generator 21 generates hydraulic fluid pressure by pushing the piston 31 in a direction of inserting the rod 32 into the cylinder 30. Here in the second embodiment, the hydraulic fluid pressure generator 121 generates hydraulic fluid pressure by pulling the piston 131 in a direction of pulling out the rod 132 from the cylinder 130, as shown in FIGS. 6 and 7. In particular, the rod 132 is pulled by the braking operation of a first operation lever 137 of a control lever member 122 about a first axis X1. When the piston 131 is in a first position shown in FIG. 6, the piston 131 is disposed near the rear wall of the cylinder 130. When the piston 131 is in a second position shown in FIG. 7, wherein the piston 131 has been pulled by the first operation lever 137, a second port 130c is disposed between a first seal member 136a and a second seal member 136b. A first port 130b of the cylinder 130 is disposed in the front side wall of the cylinder 130.

A second bracket 139 of a support member 135 is provided with a pulling member 141 having a curved surface 141a in which a groove 141b is formed for pulling the rod 132. In the second embodiment, the tip of a rod 132 is provided not with a roller, but with a rod-shaped engaging part 132c which engages with the curved surface 141a on both sides of the groove 141b and which is orthogonal to a rod main body 132a.

A lever spindle 126 is disposed at the bottom of first brackets 124b and a second bracket 139, similar to a conventional braking device operated to brake by a braking cable.

With the control device 112 of the second embodiment configured in this manner, when the first operation lever 137 is operated about the first axis X1, the rod 132 is pulled by the pulling member 141. The piston 131 is thereby pulled within the cylinder 130, the hydraulic fluid pressure is generated, and the braking device 18 brakes the bicycle. Because hydraulic fluid pressure is generated by the piston 131 being pulled by the first operation lever 137 within the cylinder 130, only pulling force acts on the rod 132, which is the linking portion between the piston 131 and the first operation lever 137. Therefore, buckling no longer occurs in the rod 132, the linking portion can be less rigid, and the weight of the rod 132 can be reduced.

Other Embodiments

An embodiment of the present invention was described above, but the present invention is not limited to the above embodiment, and various alterations can be made within a range that does not deviate from the scope of the invention. Particularly, the plurality of embodiments and modifications written out in the present specification can be combined in any desired manner as needed.

(a) In the first and second embodiments, a disc brake device is given as an example of a braking device that can be activated by hydraulic fluid pressure, but the braking device controlled by the present invention is not limited to a disc brake device. The present invention can be applied to a control device for controlling any bicycle braking device that can be activated by hydraulic fluid pressure. For example, the present invention can also be applied to a bicycle control device for controlling a braking device such as a caliper brake or a drum brake activated by hydraulic fluid pressure.

(b) The first and second embodiments are configured so that a reservoir is provided for storing fluid for generating hydraulic fluid pressure and changes in the braking characteristics are minimized regardless of temperature changes in the fluid, but the present invention can also be applied to a bicycle control device that does not have a reservoir.

Figure 8:
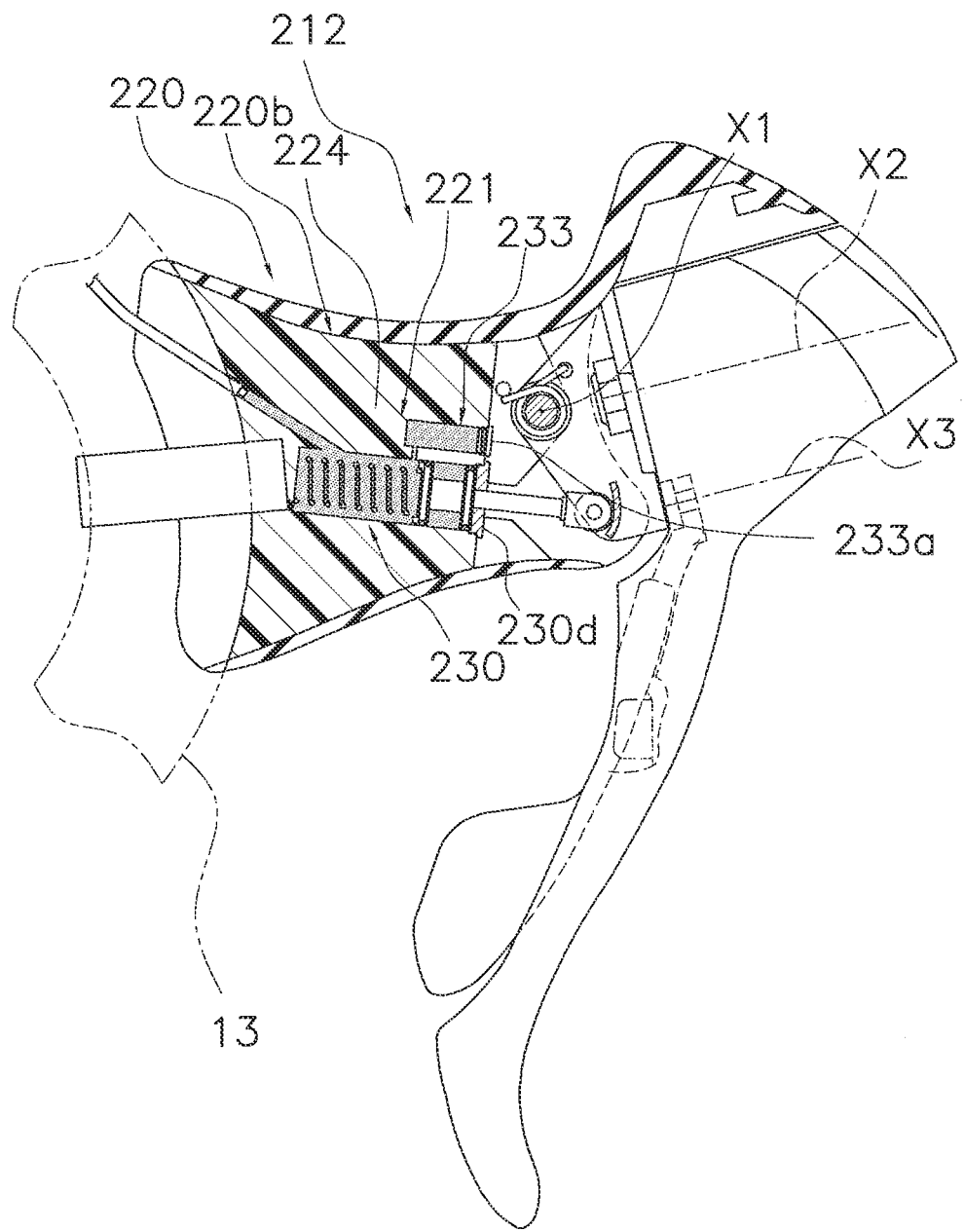
FIG. 8 is a partial cross sectional view, similar to FIG. 2, of the bicycle control device according to a third embodiment.

(c) In the first and second embodiments, the cylinder 30 and the reservoir 33 of the hydraulic fluid pressure generator 21 are provided as separate members from the support member, but the present invention is not limited as such. For example, in a control device 212 as shown in FIG. 8, a cylinder 230 and a reservoir 233 of a hydraulic fluid pressure generator 221 may be integrally formed inside a grip part 220b. The cylinder 230 is formed by being concaved into a tube shape from the front part of the main grip body 224 of the grip part 220b, and is closed by a lid member 230d. The reservoir 233 is formed by being concaved into a tube shape from the front part of the main grip body 224 of the grip part 220b, and is sealed by a seal cap 233a.

Figure 9:
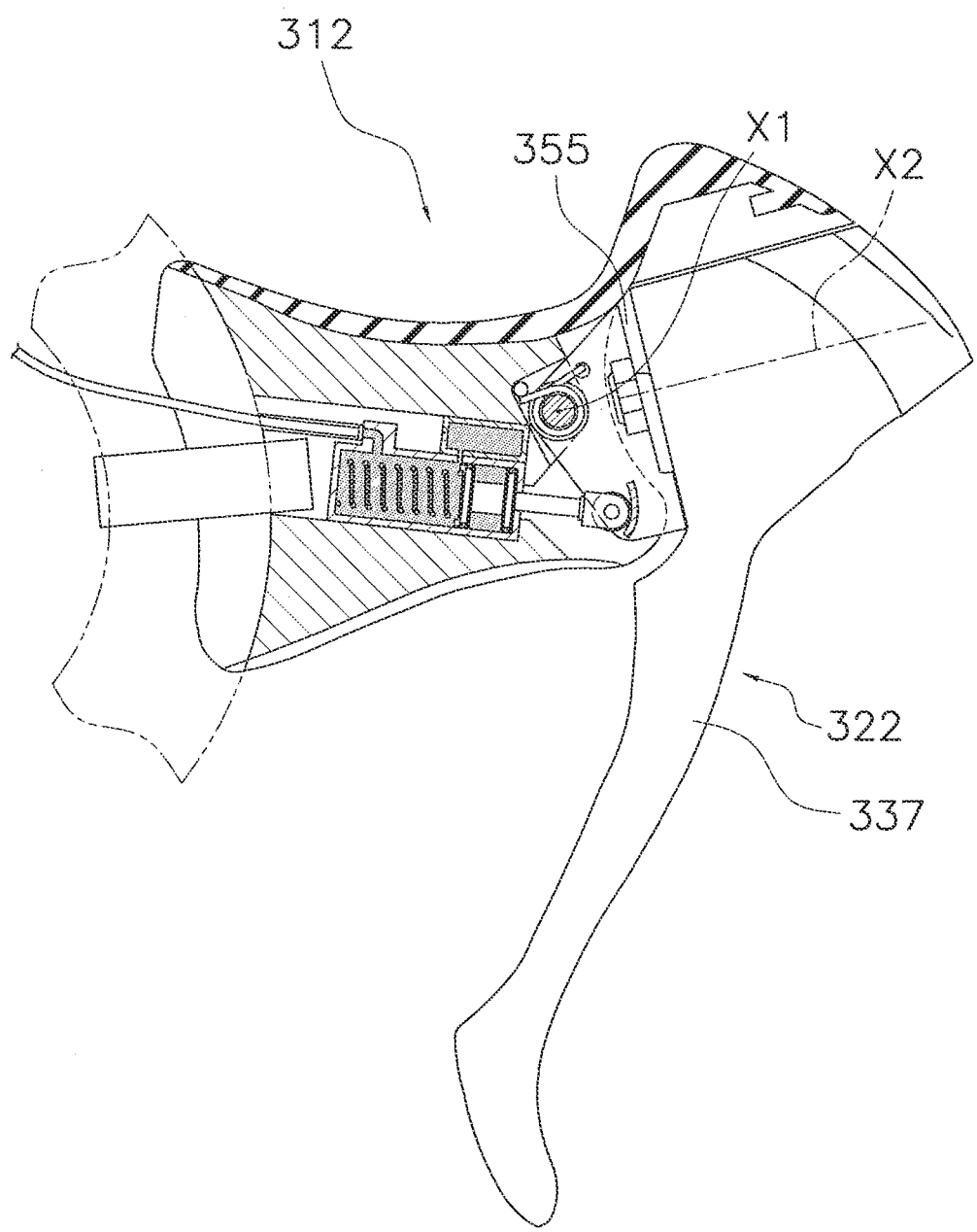
FIG. 9 is a partial cross sectional view, similar to FIG. 2, of the bicycle control device according to a fourth embodiment.

(d) in the first and second embodiments, the control lever member 22 is configured from the support member 35, the first operation lever 37, and the second operation lever 38, but a control lever member 322 of a control device 312 may be configured from a support member 335 and a single first operation lever 337, as shown in FIG. 9. In this case, a winding operation is preferably performed by pivoting the first operation lever 337 in one direction about a second axis X2, and a winding release operation is preferably performed by pivoting the first operation lever 337 in the other direction about the second axis X2.

Figure 10:
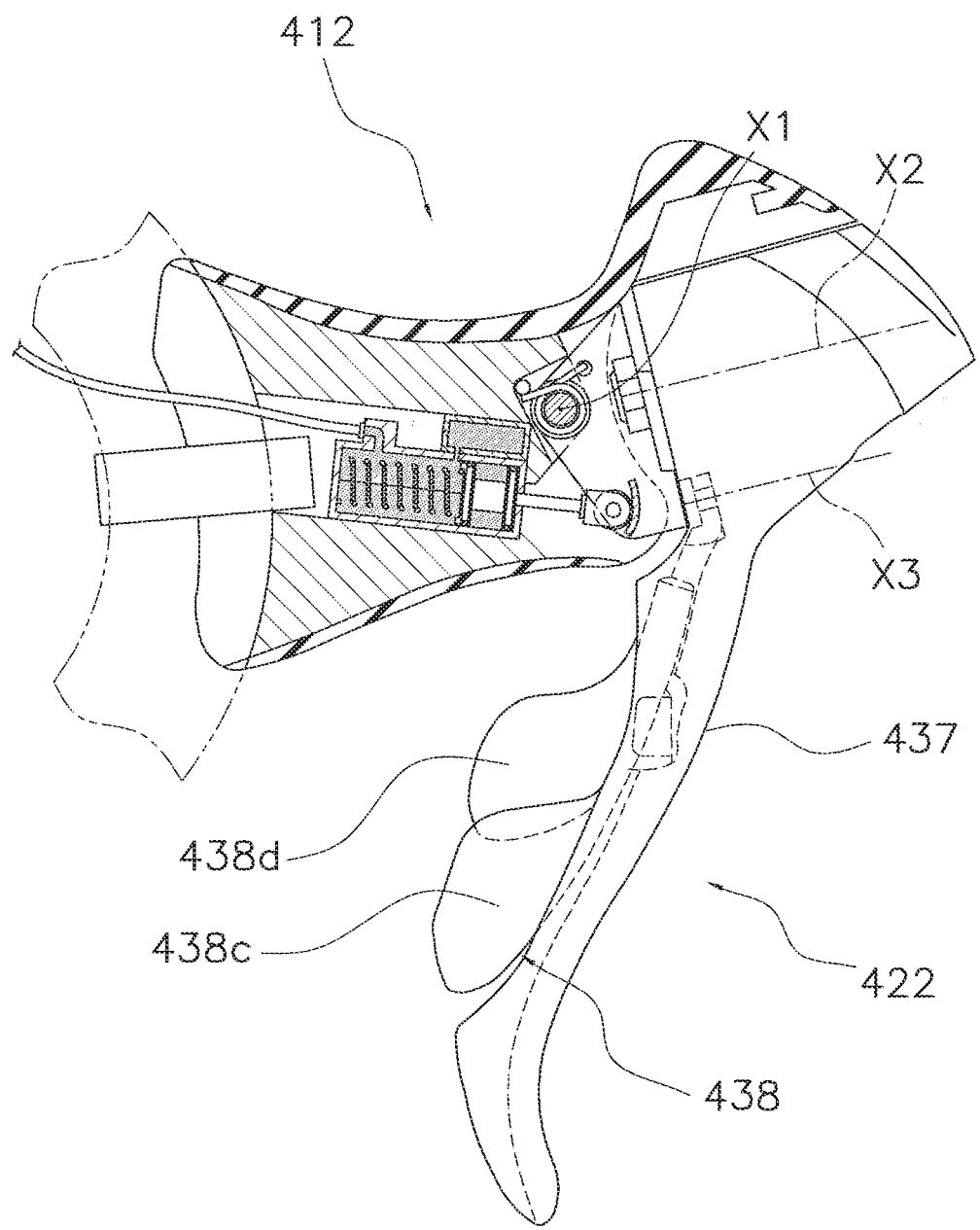
FIG. 10 is a partial cross sectional view, similar to FIG. 2, of the bicycle control device according to a fifth embodiment.

As shown in FIG. 10, a second operation lever 438 of a control lever member 422 of a control device 412 may be configured from two levers: a winding operation lever 438c and a release operation lever 438d. In this case, a first operation lever 437, which does not pivoting about the second axis X2 but pivots only about the first axis X1, is used specifically for the braking operation.

(e) In the first and second embodiments, the first return spring 34 and the second return spring 42 are provided respectively to the first operation lever 37 and the hydraulic fluid pressure generator 21, but another option is to provide a return spring to only one of these components. When a return spring is provided to the braking device side, a return spring need not be provided to the bicycle control device side.

(f) In the first and second embodiments, the piston 31 (or the piston 131) is moved by the pushing member 41 (or the pulling member 141) provided to the support member 35, but the present invention is not limited as such. For example, a cam member may be pivotally provided to the lever spindle, a linking member may be provided for linking the support member and the cam member, and the rod may be pushed or pulled by the cam member. In this case, the timing whereby hydraulic fluid pressure is generated can be regulated.

Figure 11:
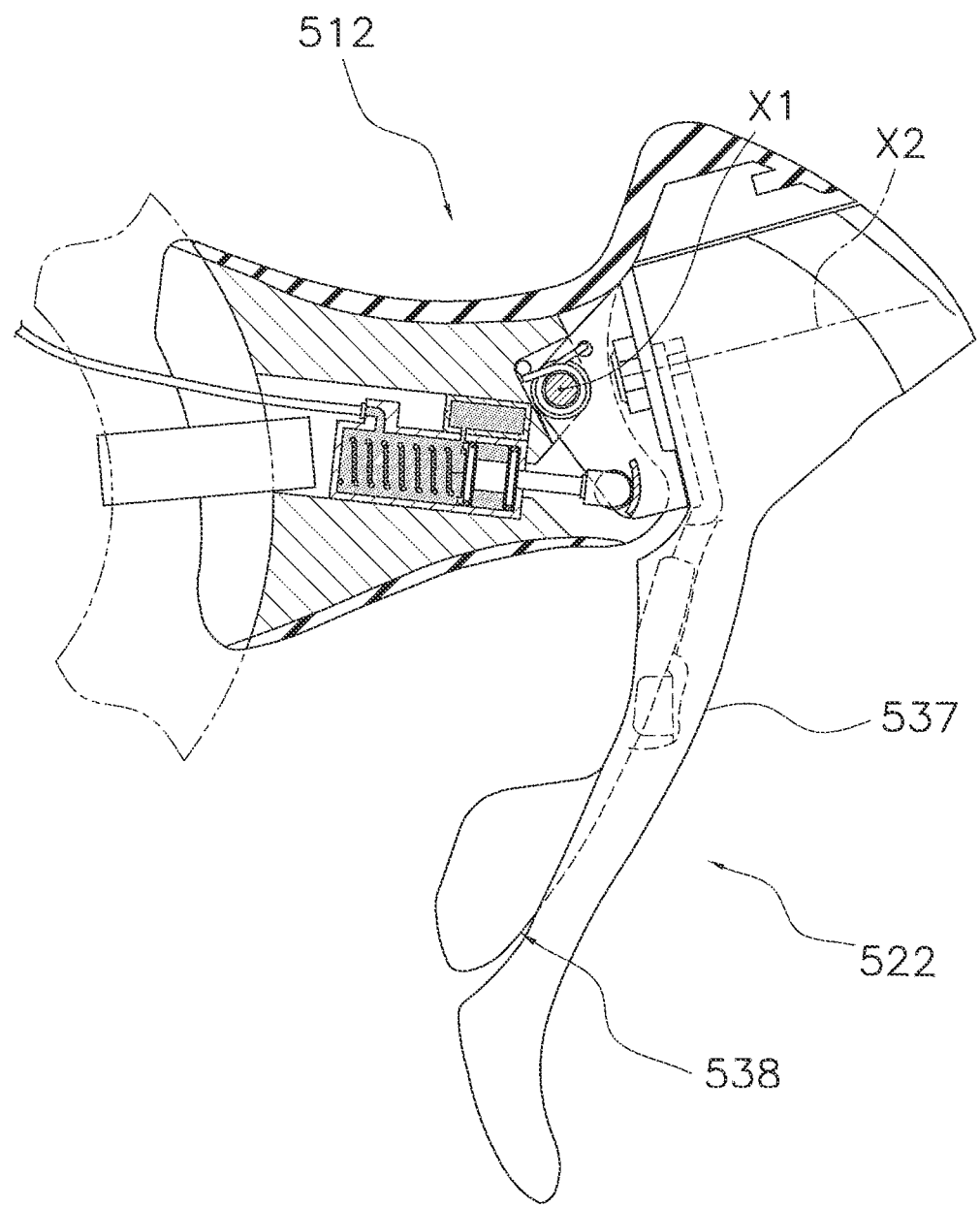
FIG. 11 is a partial cross sectional view, similar to FIG. 2, of the bicycle control device according to a sixth embodiment.

(g) In the first and second embodiments, the second operation lever 38 is configured so as to turn about the third axis X3, which is different from the first and second axes and substantially parallel with the second axis X2, and to pivot laterally from the stationary position, but the present invention is not limited as such. In a control device 512 as shown in FIG. 11, a second operation lever 538 can be coupled to the support member 35 and made to turn about the same second axis X2 as a first operation lever 537 of a control lever member 522.

Figure 12:
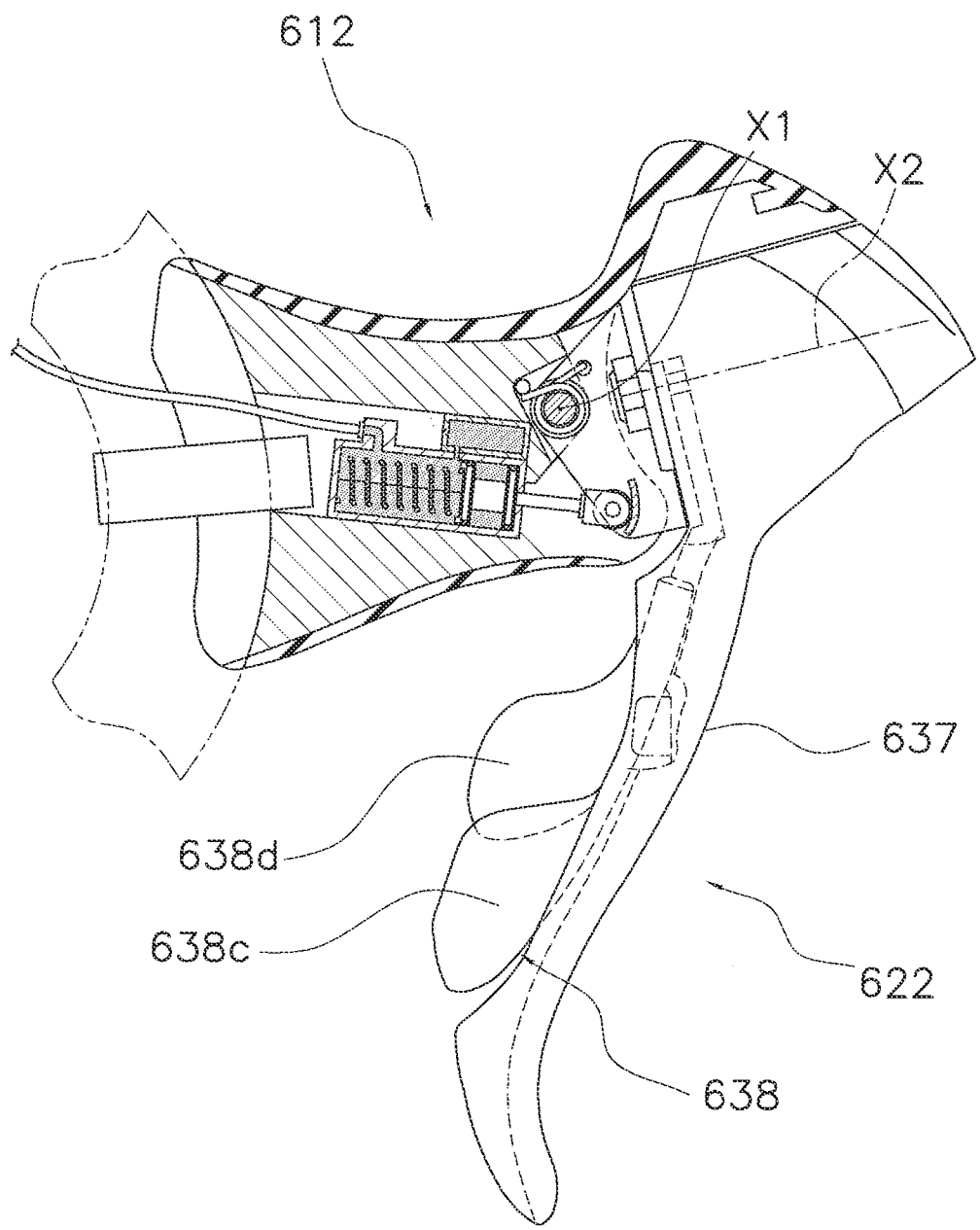
FIG. 12 is a partial cross sectional view, similar to FIG. 2, of the bicycle control device according to a seventh embodiment.

In a control device 612 as shown in FIG. 12, a winding operation lever 638c and a release operation lever 638d of a second operation lever 638 can be made to turn about the same second axis X2 as a first operation lever 637 of a control lever member 622.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the control device 12. Accordingly, these directional terms, as utilized to describe the control device 12 should be interpreted relative to a bicycle in an upright riding position on a horizontal surface and that is equipped with the bicycle control device 12. The terms "left" and "right" are used to indicate the "right" when referencing from the right side as viewed from the rear of the bicycle, and the "left" when referencing from the left side as viewed from the rear of the bicycle. Finally, terms of degree such as "substantially", "about" and "approximately" as used herein mean an amount of deviation of the modified term such that the end result is not significantly changed. These terms can be construed as including a deviation of ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
a housing member having an attachment part configured to be attached to a handlebar of a bicycle, and a grip part configured to be gripped by a rider in a riding position, the grip part including an upper surface with a downward-curving shaped surface to facilitate gripping of the grip part, and the downward-curving shaped surface of the grip part being disposed between a peaked portion of the housing member distal from the attachment part and the attachment part;
a cover member made of an elastic material that at least partially covers an outside surface of the grip part;
a hydraulic fluid pressure generator having a cylinder provided inside the grip part of the housing member, and a piston movably disposed within the cylinder to generate fluid pressure for controlling a braking device,
a control lever member having a first operation lever pivotably coupled relative to the housing member for pivoting about a first axis to operate the piston; and
a shift-operating mechanism configured to be coupled to a shifting device by a control cable, the shift-operating mechanism being mounted on the control lever member.

2. The bicycle control device according to claim 1, wherein the control lever member has a support member that pivotally couples the control lever member to the housing member about the first axis.

3. The bicycle control device according to claim 2, wherein the control lever member includes a second operation lever pivotally coupled about a second axis to operate the shift-operating mechanism as the second operation lever pivots about the second axis.

4. The bicycle control device according to claim 3, wherein the second operation lever of the control lever member includes a winding operation lever for performing a winding control operation of the control cable, and a release operation lever for performing a winding release operation of the control cable.

5. The bicycle control device according to claim 3, wherein the first operation lever of the control lever member is a winding operation lever for performing a winding control operation of the control cable, and the second operation lever is a release operation lever for performing a winding release control operation of the control cable.

6. The bicycle control device according to claim 2, wherein the shift-operating mechanism is supported on the support member and includes a cable take-up member pivotally mounted about a second axis different from the first axis.

7. The bicycle control device according to claim 6, wherein the first operation lever of the control lever member is pivotally coupled to the support member about the second axis, and the first operation lever operates the cable take-up member as the first operation lever pivots about the second axis.

8. The bicycle control device according to claim 6, wherein the control lever member includes a second operation lever pivotally coupled about a third axis to operate the shift-operating mechanism as the second operation lever pivots about the third axis, which is different from the first and second axes.

9. The bicycle control device according to claim 6, wherein the first axis and the second axis are not parallel.

10. The bicycle control device according to claim 9, wherein
the first axis is substantially perpendicular to the traveling direction of the bicycle and the second axis being substantially parallel to the traveling direction of the bicycle, when the bicycle control device is mounted on the bicycle in an installed position.

11. The bicycle control device according to claim 2, wherein
the first operation lever of the control lever member is pivotally coupled to about a second axis to operate the shift-operating mechanism as the first operation lever pivots about the second axis, which is different from the first axis, and
the control lever member includes a second operation lever pivotally coupled about a third axis to operate the shift-operating mechanism as the second operation lever pivots about the third axis, which is different from the first and second axes.

12. The bicycle control device according to claim 1, wherein
the hydraulic fluid pressure generator generates hydraulic fluid pressure by operating the piston in a direction of insertion into the cylinder.

13. The bicycle control device according to claim 1, wherein
the hydraulic fluid pressure generator generates hydraulic fluid pressure by operating the piston in a direction of pulling out of the cylinder.

14. The bicycle control device according to claim 1, wherein the hydraulic fluid pressure generator includes a rod coupled to the piston and operated by the first operation lever.

15. The bicycle control device according to claim 1, wherein
   the hydraulic fluid pressure generator further includes a reservoir coupled to the cylinder, and the reservoir storing fluid for generating hydraulic fluid pressure.

16. The bicycle control device according to claim 1, wherein
   the hydraulic fluid pressure generator further includes a return spring urging the piston in a direction opposite to a hydraulic fluid pressure generating operation direction performed by the first operation lever, the return spring being provided inside the cylinder.

17. The bicycle control device according to claim 1, wherein
   the cylinder is provided inside the housing member.

18. The bicycle control device according to claim 1, wherein
   the cylinder is provided integrally to the housing member.

19. The bicycle control device according to claim 1, wherein
   the attachment part is disposed on a proximal end of the housing member and the first operation lever is pivotably coupled relative to the housing member at a distal end of the housing member, and the grip part is disposed between the attachment part and the first operation lever.

\* \* \* \* \*